United States Patent [19]

Hulderman et al.

[11] 3,878,480

[45] Apr. 15, 1975

[54] MILLIMETER WAVE OSCILLATOR WITH A CAVITY RESONATOR

[75] Inventors: Garry N. Hulderman, Riverside; Leon J. Lader, Los Angeles; Jay B. Winderman, Claremont, all of Calif.

[73] Assignee: General Dynamics Corporation, Pomona, Calif.

[22] Filed: Sept. 24, 1973

[21] Appl. No.: 400,081

[52] U.S. Cl............. 331/96; 331/107 R; 331/107 G

[51] Int. Cl............................................. H03b 7/14

[58] Field of Search....... 331/96, 101, 107 R, 107 G

[56] References Cited

UNITED STATES PATENTS

| | | | |
|---|---|---|---|
| 3,562,672 | 2/1971 | Sugimoto et al. | 331/107 G X |
| 3,735,286 | 5/1973 | Vane | 331/101 |
| 3,792,374 | 2/1974 | Havens et al. | 331/101 X |

OTHER PUBLICATIONS

Kramer, Electronics, October 11, 1971, pp. 78–81.

*Primary Examiner*—Siegfried H. Grimm
*Attorney, Agent, or Firm*—Henry M. Bissell; Edward B. Johnson

[57] ABSTRACT

A millimeter wave oscillator has a case of block construction defining a waveguide passageway with a waveguide flange at the output end integral with the case. A plunger with a half-round surface facing the open end is disposed adjacent a wafer-like disc and a source diode has a terminal which is contacted by the disc. The diode is adjustably disposed in the case. The disc is disposed on the end of a piston slideably disposed in a capacitor body which is coupled to a source of DC bias. A spring in the body urges the disc into contact with the diode. Stubs are provided for impedance matching of the following circuit.

10 Claims, 2 Drawing Figures

PATENTED APR 15 1975 3,878,480

MILLIMETER WAVE OSCILLATOR WITH A CAVITY RESONATOR

BACKGROUND OF THE INVENTION

1. Field of the Invention.

The present invention is concerned generally with millimeter wave devices, and is particularly concerned with oscillators for providing a source of local oscillator energy for combining with rf energy in a millimeter wave mixer, and for providing a source of transmitter energy such as in missiles and radars.

2. Description of the Prior Art.

As is well known, the field of microwave electronics has been dominated largely by transmission structures which are commonly referred to as "plumbing". This designation is made with reference to waveguides, usually rectangular in configuration, and within which it is practical to propagate a particular desired frequency mode (commonly the dominant mode) with low attenuation. As is further well known, any discontinuities or irregularities in the waveguide give rise to reflections, bringing on problems of impedance matching and the possible existence of standing waves.

The problem is further compounded if there is any necessity to introduce adjustable elements into the waveguide for the purpose of generating or performing an operation on or with the propagated wave. This can be extremely critical if any adjustability of the element is required.

Necessarily then, it is essential if any degree of generating and transmitting efficiency is to be retained that the waveguide must have an absolute bare minimum of discontinuities and the elements disposed therein must be easily adjusted and tuned without causing additional attenuation or deterioration of the wave with higher order modes in the guide when the adjusting or tuning is done.

SUMMARY OF THE INVENTION

There is disclosed herein a millimeter wave oscillator which generates millimeter wave energy with excellent efficiency and frequency stability, ease of adjustment, and minimum leakage, using a package that can be fabricated from lightweight plastic material. It is a general object of the invention to provide such an oscillator.

It is a further object to provide a solid state microwave oscillator having a case of block construction, with an integral waveguide flange, to maintain good medium-term temperature stability at the diode element. It is a particular object to provide in such an oscillator a holder for the diode which is adjustable so that the position of the holder determines the depth of penetration of the source diode into the waveguide.

It is another object to provide in the aforesaid oscillator a resilient-force-biased piston means disposed in the oscillator case, having a disc on the inner end of the piston held in direct contact with the diode by means of the piston backed up with the biasing force provided preferably by a compression spring. Preferably the disc is of circular wafer-like configuration having a diameter of one-half wavelength at the frequency of the generated energy.

It is yet another object to provide a piston structure as aforesaid, having a piston stem portion slideably disposed within and in good electrical contact with a conductive capacitor body through which the biasing current is supplied from a connector, the capacitor body being isolated from the oscillator case by a thin dielectric, thereby by-passing rf energy to ground by way of the case. It is still another object to provide an oscillator as aforesaid with an adjustably positioned plunger disposed adjacent the disc and diode, the plunger having a half-round configured surface facing into the waveguide whereby the walls of the waveguide and the surfaces of the plunger and disc serve as a portion of a high Q cavity at the desired operating frequency.

Having regard for the above-mentioned objects of the invention, there will now be described in conjunction with the accompanying drawing a preferred embodiment of the invention.

DESCRIPTION OF THE PREFERRED EMBODIMENT

Figures 1, 2:
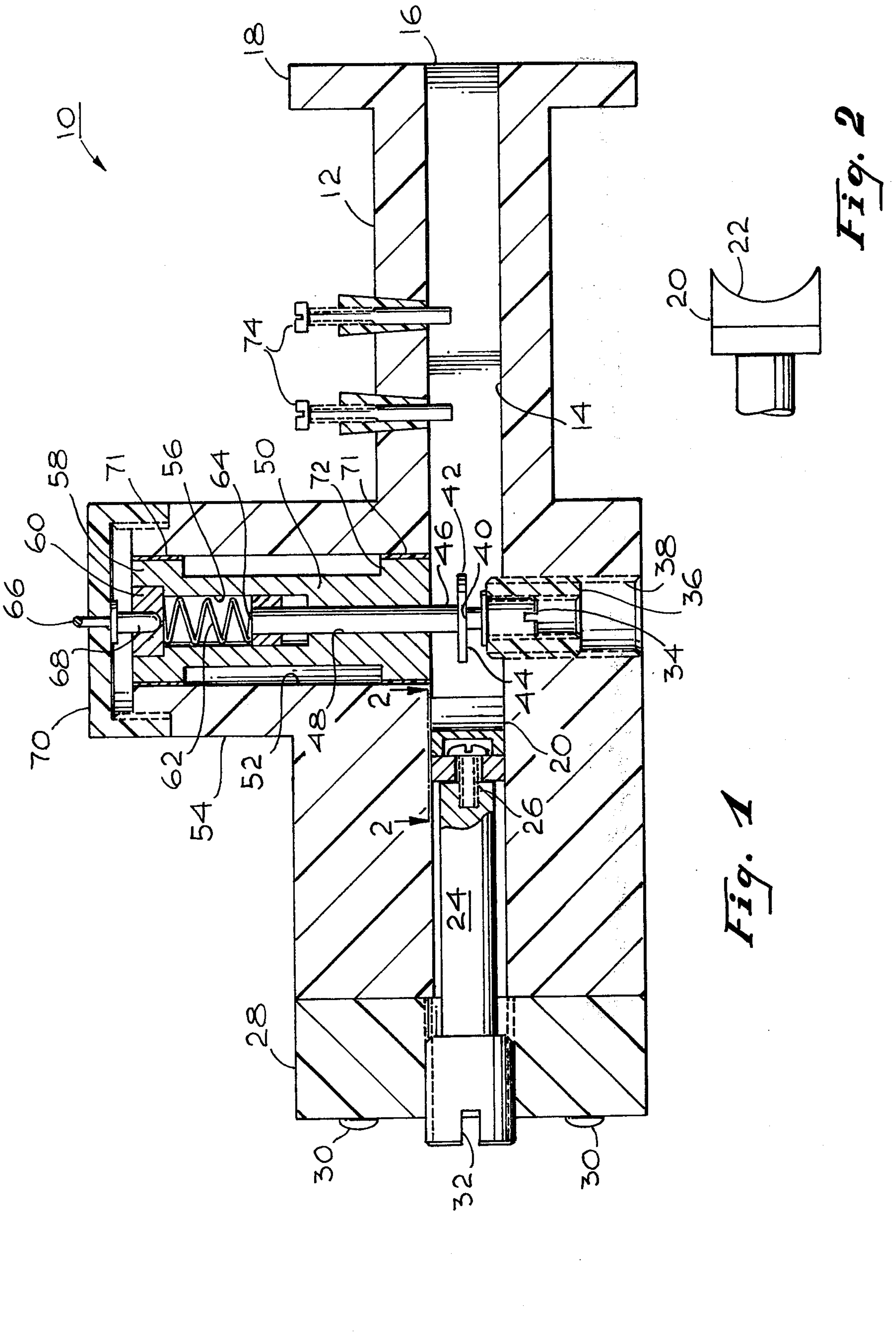
FIG. 1 is an elevation view in cross-section of one form of the invention.
FIG. 2 is a fragmentary plan view of a portion of the plunger taken on the line 2—2 of FIG. 1.

Referring to FIG. 1 there is shown a millimeter wave oscillator 10 having a case 12 of substantially block construction and provided with a longitudinally disposed wave-guide passageway 14 having an open end 16 arranged for coupling to a following circuit (not shown). The passageway 14 in this embodiment is rectangular in cross-section, the view of FIG. 1 being taken across the shorter dimension thereof. Coupling may be accomplished advantageously by means of a waveguide flange 18 formed as an integral part of the case 12. This construction represents a distinct advantage over the prior art since the flange 18 as thus formed eliminates a passageway discontinuity where it merges with the passageway 14 of the waveguide.

The opposite end of the passageway 14 is closed by a plunger 20 which, as shown in FIG. 2, is provided with a configured surface 22 preferably formed as a half-round face looking into the passageway 14. A plunger stud 24 has one end rotatably secured, as by a screw 26, to the back face of the plunger 20. The other end of the stud 24 is threadably disposed in a cap 28 secured to the case 12 by screws 30. A screwdriver slot 32 is provided on the outer end of the stud 24 whereby axialwise adjustment of the plunger 20 in the waveguide passageway 14 may be accomplished. Thus, as the stud 24 is rotated in one direction it advances the plunger 20 into the passageway, and when rotated in the other direction the plunger retreats under the urging of the screw 26.

A semiconductor active element 34 is adapted to provide the source of millimetric wave energy. As embodied in the disclosed structure, the element 34 is a diode of the negative resistance type such as a Gunn or avalanche diode. The diode element 34 is secured in a chuck or holder 36 threadably disposed in a threaded bore 38 in the case 12, the axis of the bore 38 being transversely disposed with respect to the axis of the waveguide passageway 14. Preferably the axis of the threaded holder 36, hence of the element 34 chucked therein, intersects the central axis of the passageway 14.

As is well known, it is desirable to provide a junction of a direct current bias source with the greatest possible area of the terminal 40 of the diode 34 in order to obtain the highest power output thereof in terms of millimetric oscillation efficiency and stability. To this end there is provided a disc 42 of wafer-like configuration and preferably circular with a diameter equal to somewhat less than one-half wavelength of the desired output frequency. The lower face 44 of the disc 42 is resiliently urged, by means to be described, toward the terminal 40 to effect a good contact over the greatest possible area thereof and to maintain such contact during all axial adjustments of the diode 34 by the holder 36.

From the foregoing description it is now evident to those skilled in the art that the surface of the disc 42 cooperates with the half-round surface 22 of the plunger 20 and the adjacent walls of the waveguide passageway 14 to serve as a portion of a high Q cavity at the desired output frequency.

As was stated above, the disc 42 is resiliently urged in sustained contact with the diode 34, and to this end there is provided a piston 46 on the inner end of which is formed the aforesaid disc 42. The piston 46 is slideably disposed in good electrical contact within a close tolerance bore 48 in a conductor body 50 which is fixedly disposed in the enlarged bore 52 provided in an outwardly extending arm 54 of the case 12. Preferably the axis of the piston 46 and the disc 42 lies on the axis of the diode 34 and holder 36, with their common axis being normal to and intersecting the axis of the waveguide passageway 14.

The body 50 is provided with an interiorly disposed well 56 depending from the outer end 58 of the body 50. The well 56 is enlarged at its outer end to accommodate a closure member 60 therein. A compression spring 62 is disposed in the well 56 intermediate the closure member 60 and the outer end 64 of the piston 46 to urge the disc 42 into following contact with the terminal 40 of the diode 34.

A bias voltage, which may be constant or pulsed direct current as desired, is applied by way of a conductor 66 secured to a contact member 68 extending through the closure member 60 to complete an electrical path to the piston 46 via the conductor body 50. The contact member 68 is mounted in the cap 70 which is threadably disposed on the arm 54. The bias voltage for the semiconductor element 34 is thus applied from the conductor 66 through the closure member 60 and conductor body 50, and thence by way of the large area and close fitting sliding contact between the bore 48 thereof with piston 46 through the disc 42 to the junction of the face 44 thereof with the terminal surface 40 of the diode 34.

Preferably the conductor body 50 forms one electrode of a capacitor with the inner conducting wall of the bore 52 serving as the grounded electrode of the capacitor in order to by-pass rf energy which might leak from the piston 46 back through the body 50 into the conductor 66. To this end there is provided thin insulating dielectric material 71 between the outer surfaces of the lands 72 of the body 50 and the securing surface of the bore 52.

It is obvious to those skilled in the art that greatest efficiency of the oscillator is achieved when the impedance seen by the following circuit is substantially equal to the input impedance of that circuit. To this end the oscillator 10 may be provided with impedance matching stubs 74 adjustably disposed in the case 12 with the stub ends extending into the waveguide passageway 14, all as well known practice in the art.

Note should be taken of the possible variations which might be made from the structure as disclosed. For example, various arrangements of resilient biasing means, other than the arrangement including the compression spring 62, will immediately be apparent to those skilled in the art. Likewise, the particular threadable arrangement between the holder 36 and the case 12 by which the diode 34 is movably adjusted in the waveguide passageway 14 might well be replaced by any one of a large number of equivalent structural arrangements well known in the art. Similarly, the same remarks hold true for the structure by which the plunger 20 is adjustably disposed in the passageway 14.

To summarize, those skilled in the art will now recognize that an important advance has been made in the art of packaging microwave oscillator elements within a case of block construction which is adaptable to rapid fabrication from low-cost lightweight material such as plastic. In that regard it will be immediately also recognized by those skilled in the art that conductive surfaces of the waveguide, which may be fabricated from such plastic, can be achieved by depositing or plating those conducting surfaces with a metal such as gold.

Although there has been described above one specific arrangement of a millimeter wave oscillator in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A millimeter wave oscillator for generating a wave output to be applied to a following circuit comprising:

an oscillator case of substantially block construction and defining a longitudinally disposed waveguide passageway open at one end for coupling to said following circuit;

closure means disposed in said passageway to close off the other end thereof;

semiconductor holder means adjustably disposed in said case for orthogonal movement relative to the longitudinal axis of said waveguide passageway;

semiconductor means secured in said holder means, said semiconductor means having at least two electrodes, one of which terminates at a terminal on the exterior of said semiconductor means;

disc means having one face coupled to said terminal and disposed for movement with said semiconductor means for matching the impedances of the semiconductor means and the waveguide passageway for various positions of said semiconductor means;

piston means movably disposed in said case substantially opposite said holder means, the other face of said disc means being coupled adjacent one end of said piston means, whereby said piston means is adapted for a movement along an axis thereof in following relationship with adjustment movement of said holder means; and resilient biasing means disposed in said case for urging said piston means toward said holder means to maintain direct contact by said one face of said disc means with said terminal of said semiconductor means.

2. The oscillator of claim 1 in which said closure means is provided with a configured surface facing into said passageway, said configured surface together with the walls of said passageway and of said disc forming at least a portion of a high Q cavity resonant at the desired output frequency.

3. The oscillator of claim 2 in which said closure means comprises plunger means adjustably disposed in said passageway, the said configured surface thereof being substantially half-round and concave, the oscillator further characterized in that said disc means comprises a round wafer-like disc with a diameter of substantially one-half wave-length of the desired output frequency.

4. The oscillator of claim 1 in which said holder means is threadably disposed in said case for adjustment along an axis of said holder means in a plane substantially normal to the axis of said passageway.

5. The oscillator of claim 1 in which said case defines a bore having an axis in a plane substantially normal to the axis of said passageway, the oscillator further comprising an elongate conductor body disposed within said case bore and insulated therefrom, said conductor body being provided with a piston bore adapted to accommodate at least a portion of said piston means for slidable movement therewithin.

6. The oscillator of claim 5 in which said holder means is threadably disposed in said case for adjustment along said axis of said bore.

7. The oscillator of claim 6 in which said resilient means comprises a compression spring means disposed between the other end of said piston means and said conductor body.

8. The oscillator of claim 1 in which said oscillator case comprises an integral waveguide flange disposed adjacent said open end of said passageway.

9. The oscillator of claim 1 in which said oscillator comprises at least one impedance matching stub disposed in said passageway.

10. The oscillator of claim 5 in which said conductor body forms with said case a capacitor to bypass rf energy to the case.

* * * * *